US012607260B2

(12) United States Patent
Claywell et al.

(10) Patent No.: US 12,607,260 B2
(45) Date of Patent: Apr. 21, 2026

(54) SYSTEM AND METHOD FOR OPERATING A LUBRICATION SYSTEM WITH BRAKE ACTUATED VALVE

(71) Applicant: GM GLOBAL TECHNOLOGY OPERATIONS LLC, Detroit, MI (US)

(72) Inventors: Mark R. Claywell, Birmingham, MI (US); James M. Hart, Belleville, MI (US); Daryl A. Wilton, Macomb, MI (US); Zachary Juday, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2 days.

(21) Appl. No.: 18/810,909

(22) Filed: Aug. 21, 2024

(65) Prior Publication Data

US 2026/0055812 A1    Feb. 26, 2026

(51) Int. Cl.
*F16H 63/34*        (2006.01)
*F16H 57/04*        (2010.01)

(52) U.S. Cl.
CPC ..... *F16H 63/3433* (2013.01); *F16H 57/0417* (2013.01); *F16H 57/0432* (2013.01); *F16H 57/0434* (2013.01)

(58) Field of Classification Search
CPC ............. F16H 57/0435; F16H 63/3433; F16H 57/0417; F16H 57/0432; F16H 57/0434; F16H 57/0476
See application file for complete search history.

(56) References Cited

U.S. PATENT DOCUMENTS

| | | | | | |
|---|---|---|---|---|---|
| 8,267,830 | B2 * | 9/2012 | Brown | ................. | F16H 37/022 |
| | | | | | 475/210 |
| 10,479,343 | B2 * | 11/2019 | Frait | ................... | B60W 10/113 |
| 10,703,369 | B2 * | 7/2020 | Hathaway | ........... | F16H 63/3433 |
| 12,078,238 | B2 * | 9/2024 | Nakawatari | ......... | F16H 57/0471 |
| 12,552,340 | B2 * | 2/2026 | Süß et al. | ............... | B60R 16/08 |

(Continued)

FOREIGN PATENT DOCUMENTS

| | | |
|---|---|---|
| DE | 102018112665 A1 | 11/2019 |
| DE | 102019123981 A1 | 3/2021 |
| DE | 102021208238 A1 | 2/2023 |

(Continued)

*Primary Examiner* — Jake Cook
(74) *Attorney, Agent, or Firm* — Quinn IP Law

(57) ABSTRACT

A lubrication system for a vehicle includes a heat exchanger having a lubricant inlet and a lubricant outlet with the lubricant outlet having a first outlet branch and a second outlet branch. The lubrication system also includes a stator lubrication circuit, a rotor lubrication circuit, and a gearbox lubrication circuit fluidly connected between the lubricant inlet and the first outlet branch. The gearbox, stator, and rotor lubrication circuits are connected fluidly in parallel with each other. The system also includes a park actuator assembly having a parking pawl configured to move between a parking position and a release position allowing movement of the drivetrain gear and a park actuated valve configured to move into a first position blocking lubricant flow through the second outlet branch when in the parking position and into a second position allowing lubricant flow through the second outlet branch when in the release position.

20 Claims, 8 Drawing Sheets

(56) References Cited

U.S. PATENT DOCUMENTS

2023/0287975  A1      9/2023  Xie

FOREIGN PATENT DOCUMENTS

| | | |
|---|---|---|
| DE | 102022210957  A1 | 4/2024 |
| DE | 102022004244  A1 | 5/2024 |
| DE | 102023200684  A1 | 8/2024 |
| WO | 0037836  A1 | 6/2000 |

* cited by examiner

SYSTEM AND METHOD FOR OPERATING A LUBRICATION SYSTEM WITH BRAKE ACTUATED VALVE

INTRODUCTION

Electrified powertrain systems of motor vehicles and other mobile electrical systems include an electrical system configured to energize one or more electric motors to generate motive torque. For example, an electric traction motor may be connected to the road wheels of an electric vehicle, with generated output torque being directed to the road wheels to propel the electric vehicle on a road surface. To this end, a high-voltage bus of the electric vehicle is connected to a rechargeable energy storage system ("RESS"), a principal component of which is a propulsion battery pack having an application-suitable number and configuration of electrochemical battery cells. The battery pack-to-motor connection is made through an intervening power inverter module when the electric traction motor is configured as a polyphase/alternating current ("AC") machine. To cool and lubricate portions of the drive train of the electric vehicle, a lubrication system circulates a lubricant to the various components to perform at least one of a cooling or lubricating function.

SUMMARY

Disclosed herein is a lubrication system for a vehicle. The lubrication system includes a heat exchanger having a lubricant inlet and a lubricant outlet with the lubricant outlet having a first outlet branch and a second outlet branch. The lubrication system also includes a stator lubrication circuit, a rotor lubrication circuit, and a gearbox lubrication circuit fluidly connected between the lubricant inlet and the first outlet branch. The gearbox lubrication circuit, the stator lubrication circuit, and the rotor lubrication circuit are connected fluidly in parallel with each other. The system also includes a park actuator assembly includes a parking pawl configured to move between a parking position limiting movement of a drivetrain gear and a release position allowing movement of the drivetrain gear and a park actuated valve configured to move into a first position blocking lubricant flow through the second outlet branch when the parking pawl is in the parking position and into a second position allowing lubricant flow through the second outlet branch when the parking pawl is in the release position.

In one aspect of the disclosure the park actuator assembly includes a rotary shaft configured to move the park actuated valve between the parking position and the release position.

In one aspect of the disclosure the park actuator assembly includes a rooster comb rotatably attached to the rotary shaft with an arm attached to the rooster comb at a proximal end having a park actuator at a distal end.

In one aspect of the disclosure the park actuator assembly is configured to bias the parking pawl towards the drivetrain gear when in the parking position.

In one aspect of the disclosure the park actuator assembly is configured to release the parking pawl from the drivetrain gear when in the release position.

In one aspect of the disclosure the park actuated valve includes a fluid passage in the rotary shaft and the rotary shaft is configured to block lubricant flow when the park actuated valve is in the parking position and the fluid passage is aligned with the second outlet branch when the park actuated valve is in the release position.

In one aspect of the disclosure the park actuated valve includes a spring-loaded piston type valve.

In one aspect of the disclosure the rooster comb includes a valve engagement surface that is configured to bias the spring-loaded piston type valve into a closed position at least partially blocking lubricant flow through the second outlet branch when the rotary shaft is in the parking position and release the spring-loaded piston type valve when the rotary shaft is in the release position.

In one aspect of the disclosure the rooster comb includes a first recess for accepting a locator when in a first rotational position corresponding to the parking position and a second recess for accepting the locator when in a second rotational position corresponding to the release position.

In one aspect of the disclosure the first recess is located adjacent a first circumferential end of a comb projection and the second recess is located adjacent a second circumferential end of the comb projection and the first and second recesses define a maximum rotational range of the rooster comb.

In one aspect of the disclosure the gearbox lubrication circuit, the stator lubrication circuit, and the rotor lubrication circuit are connected fluidly in parallel with an auxiliary lubrication circuit between the lubricant outlet of the heat exchanger and a sump.

In one aspect of the disclosure the stator lubrication circuit includes a stator orifice having a stator lubrication circuit maximum flow rate, the gearbox lubrication circuit includes a gearbox orifice having a gearbox lubrication circuit maximum flow rate, and the rotor lubrication circuit includes a rotor orifice having a rotor lubrication circuit maximum flow rate.

Disclosed herein is a method of operating a lubrication system. The method includes directing lubricant through a heat exchanger to a lubricant outlet with the lubricant outlet including a first outlet branch and a second outlet branch. The method also includes directing the lubricant through the first outlet branch to a stator lubrication circuit and selectively directing the lubricant through the second outlet branch to at least one of a rotor lubrication circuit, a gearbox lubrication circuit, or an auxiliary lubrication circuit based on a parking status of a park actuator assembly. The park actuator assembly includes a parking pawl configured to move between a parking position limiting movement of a drivetrain gear and a release position allowing movement of the drivetrain gear and a park actuated valve configured to move into a first position blocking lubricant flow through the second outlet branch when the parking pawl is in the parking position and into a second position allowing lubricant flow through the second outlet branch when the parking pawl is in the release position.

The disclosure herein is directed to a vehicle. The vehicle includes a passenger compartment, wheels supporting the passenger compartment, a traction motor having a rotor and a stator with the rotor configured to drive at least one of the plurality of wheels through a gearbox, and a lubrication system. The lubrication system includes a heat exchanger having a lubricant inlet and a lubricant outlet with the lubricant outlet having a first outlet branch and a second outlet branch. The lubrication system also includes a stator lubrication circuit, a rotor lubrication circuit, and a gearbox lubrication circuit fluidly connected between the lubricant inlet and the first outlet branch. The gearbox lubrication circuit, the stator lubrication circuit, and the rotor lubrication circuit are connected fluidly in parallel with each other. The system also includes a park actuator assembly including a parking pawl configured to move between a parking position limiting movement of a drivetrain gear and a release position allowing movement of the drivetrain gear and a park actuated valve configured to move into a first position blocking lubricant flow through the second outlet branch when the parking pawl is in the parking position and into a second position allowing lubricant flow through the second outlet branch when the parking pawl is in the release position.

BRIEF DESCRIPTION OF THE DRAWINGS

FIG. 7 illustrates a flow diagram of an example method of operating one of the lubrication circuits shown FIG. 2 or FIG. 3.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

Those having ordinary skill in the art will recognize that terms such as "above," "below", "upward", "downward", "top", "bottom", "left", "right", etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may include a number of hardware, software, and/or firmware components configured to perform the specified functions.

Figure 1:
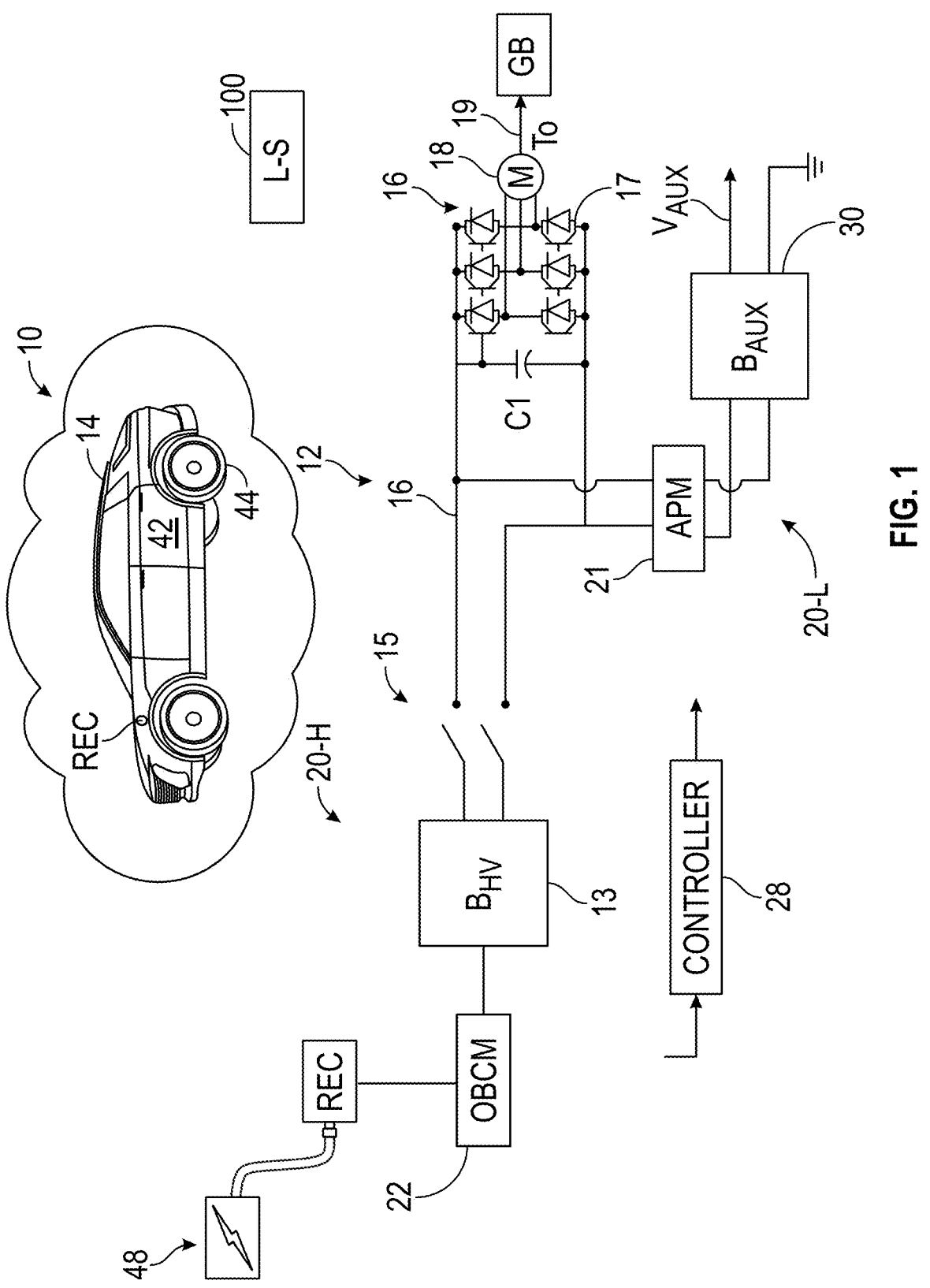
FIG. 1 is a schematic illustration of an example vehicle having an electric drivetrain.

Referring to the drawings, like reference numerals correspond to like or similar components throughout the several Figures. FIG. 1 illustrates an electrical system 12, e.g., an electrified powertrain system of a motor vehicle 10 having a vehicle body 14 defining a vehicle interior 42 or passenger compartment. The motor vehicle 10 of FIG. 1 includes a charging receptacle REC in communication with the electrical system 12. The motor vehicle 10 also includes road wheels 44 for traveling along roadways. The wheels 44 may be driven/powered through the electrical system 12 or undriven/freewheeling, as described in greater detail below.

The electrical system 12 includes separate high-voltage and low-voltage buses. The high-voltage bus 20-H is in electrical communication with a high-voltage battery pack assembly 13, such as a traction battery, and the low-voltage bus 20-L is in electrical communication with an auxiliary battery ("$B_{AUX}$") 30. At least on-board charging module ("OBCM") 22—include inputs in communication with the charging receptacle REC as power converters to convert an AC power source from a charge station 48 to DC power at an outlet to charge the battery pack assembly 13. At least one auxiliary power module ("APM") 21 isolate the high-voltage bus 20-H from the low-voltage bus 20-L with input in communication with the high-voltage bus 20-H and outputs in communication with the low-voltage bus 20-L to charge the auxiliary battery 30 and power vehicle accessories, such as heated seats, power windows, or navigation systems. The OBCM 22 and APM 21 are both in communication with an electronic controller 28 in the electrical system 12.

Figure 5A:
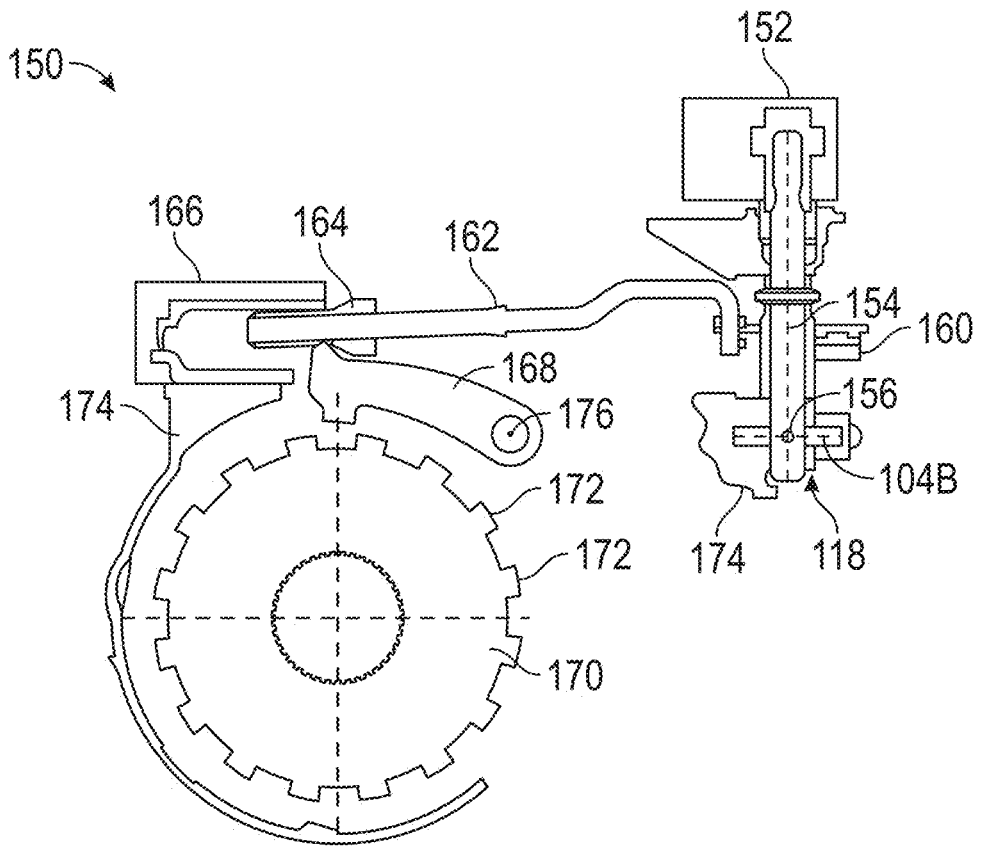
FIG. 5A is a schematic illustration of the park actuator assembly of FIG. 4A in a release position.
Figure 5B:
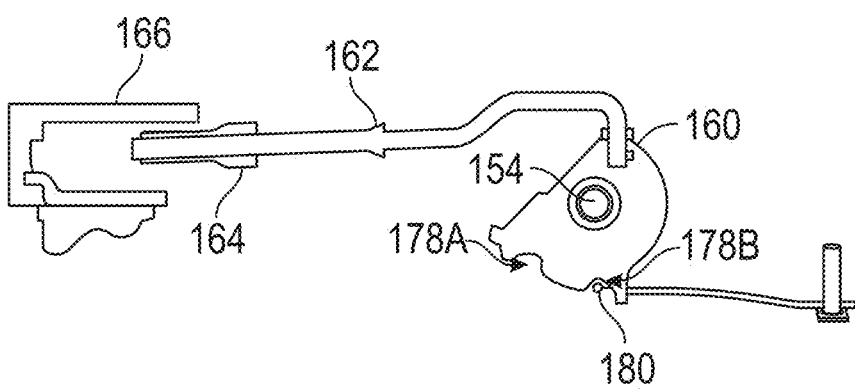
FIG. 5B is a schematic illustration of a rooster comb and actuator of the park actuator assembly shown in FIG. 4A in the release position.

The electronic controller 28 may include a computer and/or processor, and include software, hardware, memory, algorithms, connections, etc., for managing and controlling the operation of the motor vehicle 10. As such, a method, described below and generally represented in FIG. 5, may be embodied as a program or algorithm partially operable on the controller 28. It should be appreciated that the controller 28 may include a device capable of analyzing data from the sensors, comparing data, making the decisions required to control the operation of the motor vehicle 10, and executing the required tasks to control the operation of the motor vehicle 10.

The controller 28 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and input/output (I/O) circuitry, I/O devices, and communication interfaces, as well as signal conditioning and buffer electronics. The computer-readable memory may include non-transitory/tangible medium which participates in providing data or computer-readable instructions. Memory may be non-volatile or volatile. Non-volatile media may include, for example, optical or magnetic disks and other persistent memory. Example volatile media may include dynamic random-access memory (DRAM), which may constitute a main memory. Other examples of embodiments for memory include a flexible disk, hard disk, magnetic tape or other magnetic medium, a CD-ROM, DVD, and/or other optical medium, as well as other possible memory devices such as flash memory.

The controller 28 includes a tangible, non-transitory memory on which computer-executable instructions, including one or more algorithms, are recorded for regulating operation of the motor vehicle 10. The subject algorithm(s) may specifically include an algorithm configured to optimize energy usage of the motor vehicle 10.

Further, concerning the representative electrical system 12 of FIG. 1, the electrical system 12 is characterized by its separate high-voltage and low-voltage buses which are respectively labeled "20-H" and "20-L". For embodiments in which the electrical system 12 is part of the motor vehicle 10, e.g., an electric vehicle constructed as a battery electric vehicle, a hybrid electric vehicle, or an extended-range electric vehicle, the term "high-voltage" may encompass battery voltage capabilities of about 300 volts (V) or more. Such voltage levels are suitable for generating motive torque for vehicular propulsion functions and for powering various high-voltage accessories aboard the motor vehicle 10. The term "low-voltage" for its part refers to auxiliary voltage levels, typically 12-50V. Low-voltage conductors (not shown) thus connect the low-voltage bus 20-L to one or more low-voltage accessories located aboard the motor vehicle 10, including but not limited to lights, radios, infotainment screens, sensors, etc.

In the exemplary embodiment of FIG. 1, the battery pack assembly 13 is selectively connected to and disconnected from a load by a set of high-voltage contactors 15. The applied load in the illustrated configuration includes a DC link capacitor (C1), a power inverter module ("inverter") 16 having a plurality of semiconductor switches 17 connected to an electric traction motor ("M") 18. As appreciated in the art, inverters such as the inverter 16 shown in FIG. 1 utilize multiple dies of the semiconductor switches 17 as fast-responding ON/OFF switching devices, e.g., insulated gate bipolar transistors ("IGBTs"), metal oxide semiconductor field-effect transistors ("MOSFETs"), thyristors, etc. In a typical three-phase configuration of the electric traction motor 18, the semiconductor switches 17 are turned ON or OFF at predetermined switching intervals to output an alternating current ("AC") waveform to the electric traction motor 18.

The electric traction motor 18 shown in FIG. 1 is connected to a rotatable output member 19, such as a motor shaft and connected to a gearbox for driving the wheels 44. During drive modes, the inverter 16 is controlled with pulse width modulation ("PWM") or another application-suitable switching control technique to energize phase windings of the electric traction motor 18. As depicted, the electric traction motor 18 is a polyphase AC motor, in this instance exemplified as a three-phase machine. Rotation of the output member 19 ultimately transfers torque (To) to a coupled load, including one or more road wheels 44 of the motor vehicle 10.

Figure 2:
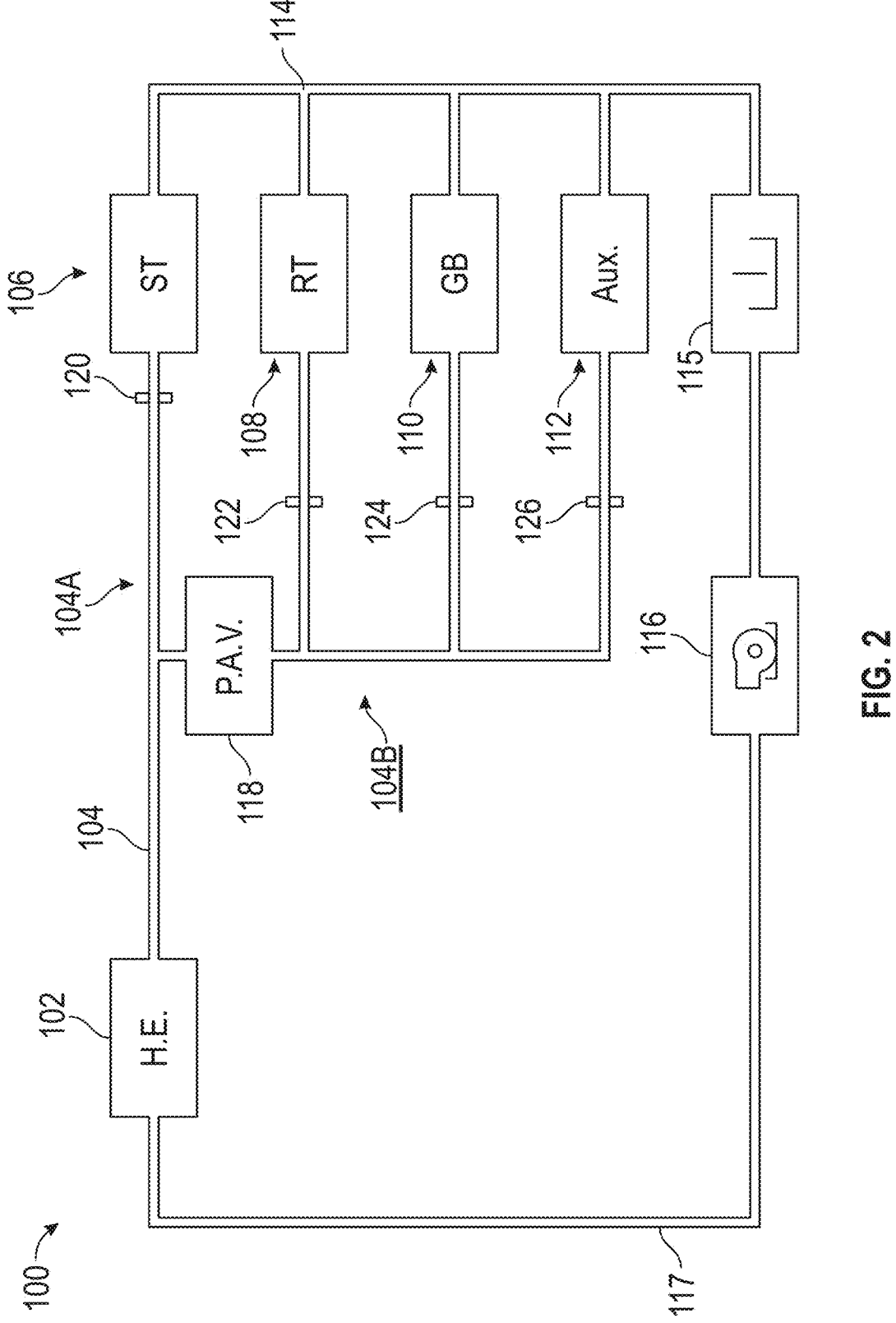
FIG. 2 is a schematic illustration of an example lubrication system for the vehicle of FIG. 1 having multiple lubrication circuits and a park actuated valve in a first location.

FIG. 2 illustrates an example lubrication system 100. In the illustrated example, the lubrication system 100 includes a heat exchanger 102 that delivers a cooled lubricant to a lubricant outlet 104. The lubricant outlet 104 includes a first outlet branch 104A that delivers a first portion of the cooled lubricant to a stator lubrication circuit 106 of the motor M and a second outlet branch 104B that delivers a second portion of the cooled lubricant to a rotor lubrication circuit 108 for the rotor of the motor M, a gearbox lubrication circuit 110 of the motor M, or an auxiliary lubrication circuit 112 that delivers cooled lubricant to auxiliary components within the drive unit or the battery pack assembly 13. The lubrication circuits 106, 108, 110, and 112 are located fluidly in parallel with each other.

A park actuated valve 118 is in the second outlet branch 104B of the lubricant outlet 104 and is upstream of the rotor lubrication circuit 108, the gearbox lubrication circuit 110, and the auxiliary lubrication circuit 112. The park actuated valve 118 selectively allows the cooled lubricant to flow through the second outlet branch 104B to the rotor lubrication circuit 108, the gearbox lubrication circuit 110, and the auxiliary lubrication circuit 112 based on the park actuator assembly being in a parking position or a release position as discussed in greater detail below. One feature of the park actuated valve 118 is that it does not require an additional actuator or control logic but is instead operated as part of a park actuator assembly 150, 250 (FIGS. 4A-6B).

A pump 116 circulates the lubricant from a sump 115 that collects the lubricant from an exhaust 114 of each of the lubrication circuits. The lubricant in the exhaust 114 includes a lower pressure than an inlet 117 to the heat exchanger 102 from the pump 116. In the illustrated example, the pump 116 can include a mechanically driven pump or an electrically driven pump having a variable output flowrate. One feature of having the electrically driven pump is that the flowrate of the lubricant can be controlled independently of a rotational output of the motor M.

In the illustrated example, stator lubrication circuit 106, the rotor lubrication circuit 108, the gearbox lubrication circuit 110, and the auxiliary lubrication circuit 112 are passively managed with a stator lubrication orifice 120, a rotor lubrication circuit orifice 122, a gearbox lubrication circuit orifice 124, and an auxiliary lubrication circuit orifice 126, respectively. Each of the orifices 120, 122, 124, and 126 can include a predetermined maximum flowrate that is at least partially defined by a diameter of the orifices 120, 122, 124, and 126. Furthermore, each of the orifices 120, 122, 124, and 126 may result in different maximum flow rates for each of the circuit.

One feature of the disclosure and the lubrication circuit 100 is that it allows for increased lubricant flow to portions of the vehicle 10 that will increase a temperature of the lubricant when the vehicle 10 is in a parked position. For the example lubrication system 100, the lubricant flow is directed to the stator lubrication circuit 106 and not the other circuits. This allows for additional current to be sent to the stator to increase the temperature of the lubricant. This is particularly helpful when initially warming up the vehicle 10.

Figure 3:
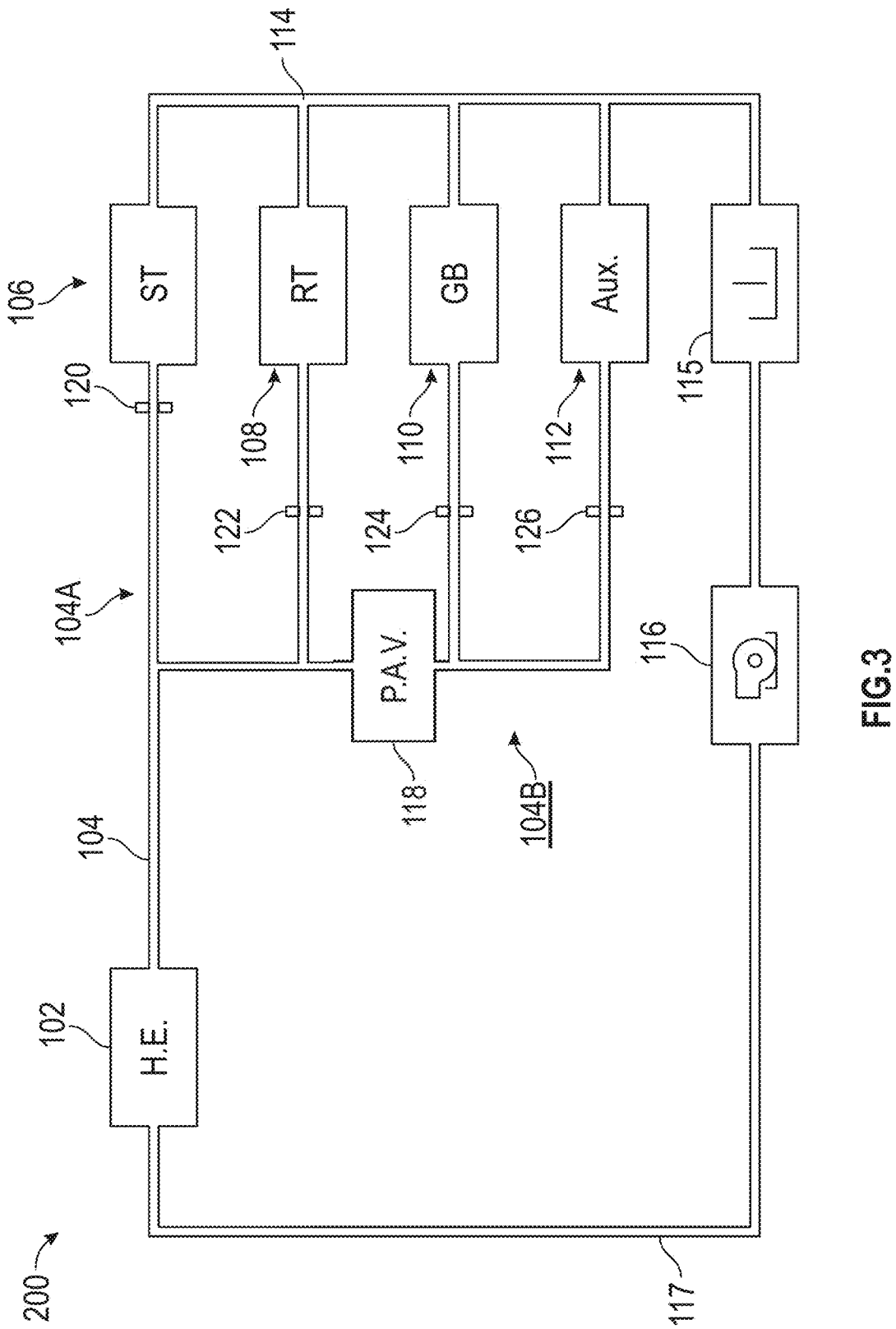
FIG. 3 is a schematic illustration of the example lubrication system of FIG. 2 with the park actuated valve in a second location.

FIG. 3 illustrates another example lubrication system 200. The lubrication system 200 is similar to the lubrication system 200 except where described below or shown in the drawings. In particular, the lubrication system 200 includes the park actuated valve 118 located downstream of a connection with the stator lubrication circuit 106 and the rotor lubrication circuit 108. Accordingly, the system 200 can selectively block the flow of cooled lubricant to the gearbox lubrication circuit 110 and the auxiliary lubrication circuit 112 with the park actuated valve 118 while the stator lubrication circuit 106 and the rotor lubrication circuit 108 continue to receive lubricant from the heat exchanger 102.

One feature of the disclosure and the lubrication circuit 200 is that it allows for increased lubricant flow to portions of the vehicle 10 that will increase a temperature of the lubricant when the vehicle 10 is in a parked position. For the example lubrication system 200, the lubricant flow is directed to the stator lubrication circuit 106 and the rotor lubrication circuit 108 and not the other circuits. This allows for additional current to be sent to the stator and the rotor to increase the temperature of the lubricant.

One feature of the disclosure is that it allows for increased lubricant flow to portions of the vehicle 10 that will increase a temperature of the lubricant. In particular, when the vehicle 10 is in a parked position. For the example lubrication system 100, the lubricant flow is directed to the stator lubrication circuit 106 and not the other circuits. This allows for additional current to be sent to the stator to increase the temperature of the lubricant.

FIGS. 4A-5B illustrate a park actuator assembly 150 having a park actuated valve 118 integrated therein that is configured to move between a closed position (FIGS. 4A-B) corresponding to the park actuator assembly 150 being in a parking position and an open position (FIGS. 5A-B) corresponding to the park actuator assembly 150 being in a release position. The park actuator assembly 150 can be used to provide the park actuated valve 118 in either the lubrication system 100 or the lubrication system 200 described above.

Figure 4A:
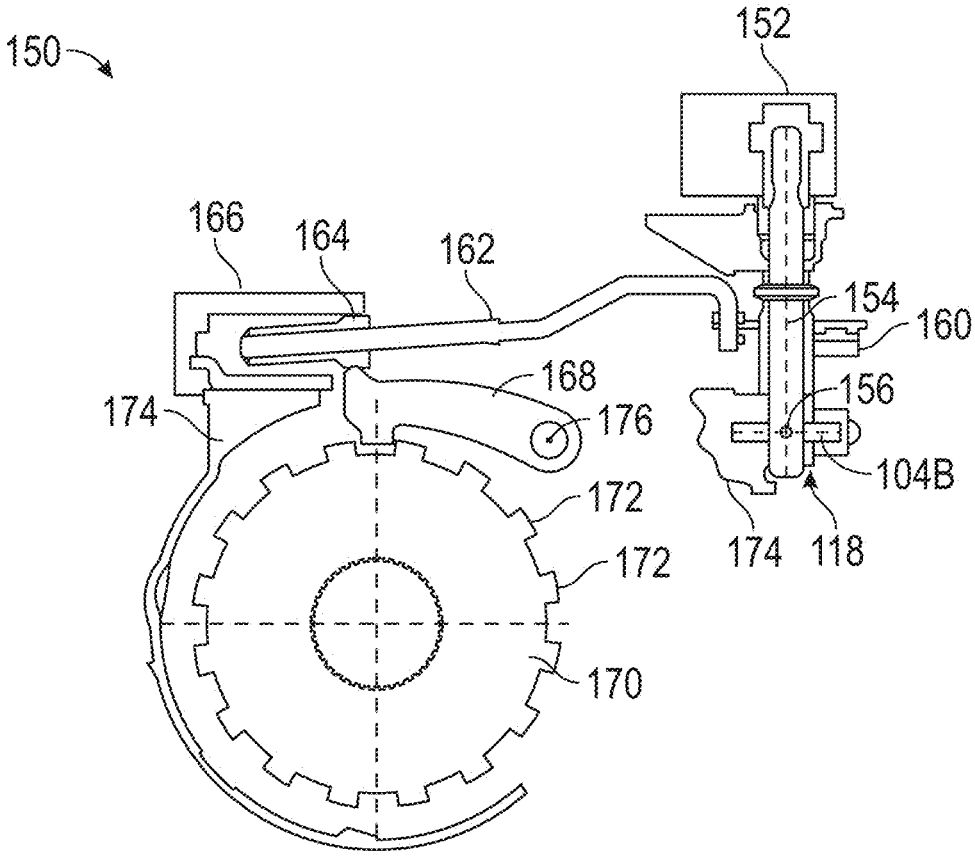
FIG. 4A is a schematic illustration of a park actuator assembly the park actuated valve of FIGS. 2-3 in a closed position.
Figure 4B:
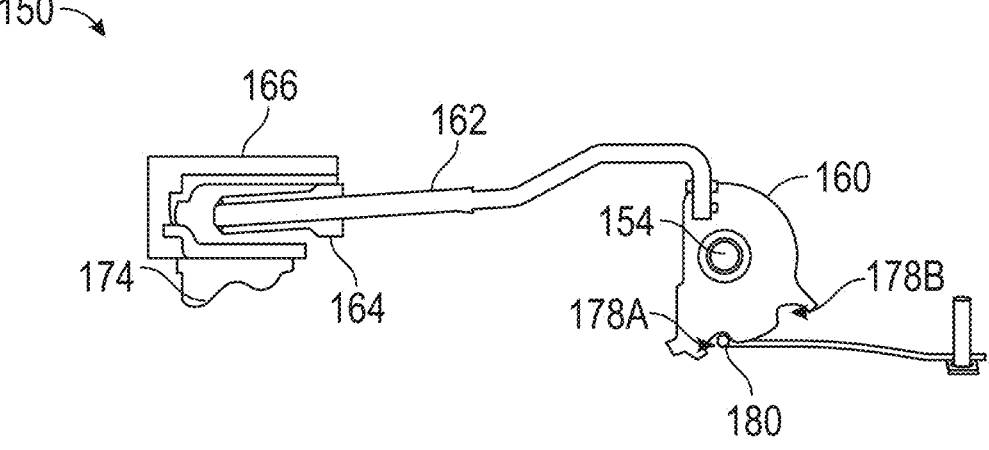
FIG. 4B is a schematic illustration of a rooster comb and actuator of the park actuator assembly shown in FIG. 4A.

As shown in FIGS. 4A and 4B, the park actuator assembly 150 includes the park actuator valve 118 integrated therein. The park actuator assembly 150 includes an input mechanism 152 that is mechanically connected to a rotary shaft 154. In the illustrated example, the input mechanism 152 can include a drive motor or a mechanical linkage. The input mechanism 152 is attached to a first or proximal end of a rotary shaft 154 and the park actuated valve 118 is at least partially integrated into a second or distal end of the rotary shaft 154.

The input mechanism 152 causes a rooster comb 160 attached to the rotary shaft 154 to rotate and move an arm 162. The arm 162 includes an actuator 164 located at a distal end that is at least partially accepted within an opening in an actuator housing 166. Movement of the arm 162 about a pin 176 causes the actuator 164 to bias a parking pawl 168 into a drivetrain gear 170. The drivetrain gear 170 is configured to restrict rotational movement of the driveline of the vehicle 10 when the parking pawl 168 engages teeth 172 along a radially outer surface of the drivetrain gear 170. The rooster comb 160 includes a first recess 178A for accepting a locator 180 when in a first rotational position and a second recess 178B for accepting the locator 180 when in the second rotational position.

The first recess 178A is located adjacent a first circumferential end of a comb projection 182 and the second recess 178B is located adjacent a second circumferential end of the comb projection 182 with the first and second recesses 178A, 178B defining a maximum rotational range of the rooster comb 160.

Conversely, the drivetrain gear 170 is configured to allow rotational movement of the driveline of the vehicle when the actuator 164 is moved to a second position allowing the parking pawl 168 to move out of engagement with the drivetrain gear 170. In the illustrated example, a housing 174 may support the rotary shaft 154 and enclose a portion of the drivetrain gear 170.

In the illustrated example, a portion of the second outlet branch 104B extends through a portion of the housing 174 of the park actuator assembly 150 such that a portion of the park actuator assembly 150 defines the second outlet branch 104B.

The second end portion of the rotary shaft 154 extends across the second outlet branch 104B and includes a fluid passage 156 that extends therethrough and is defined by the rotary shaft 154. When the rotary shaft 154 is in a first position corresponding to the park actuator assembly 150 being in the parking position, the rotary shaft 154 blocks the flow of lubricant therethrough. When the rotary shaft 154 is in the second position, the fluid passage 156 is aligned with the second outlet branch 104B and allows the flow of lubricant to one or more of the rotor lubrication circuit 108, the gearbox lubrication circuit 110, or the auxiliary lubrication circuit 112. In the case of the lubricant system 100, the cooled lubricant passes through the stator lubrication circuit 106 and not through the other lubrication circuits 108, 110, and 112 when the rotary shaft is in the second position blocking lubricant flow. Conversely, when the park actuator assembly 150 is in a release position (FIGS. 5A and 5B), vehicle 10 is allowed to move and lubricant is allowed to flow through the second outlet branch 104B.

FIGS. 6A-7B illustrate a park actuator assembly 250. The park actuator assembly 250 is similar to the park actuator assembly 150 except where described below or shown in the drawings. Similar or like components will include the addition of a leading "2" for the park actuator assembly 250 in place of the leading "1."

Figure 6A:
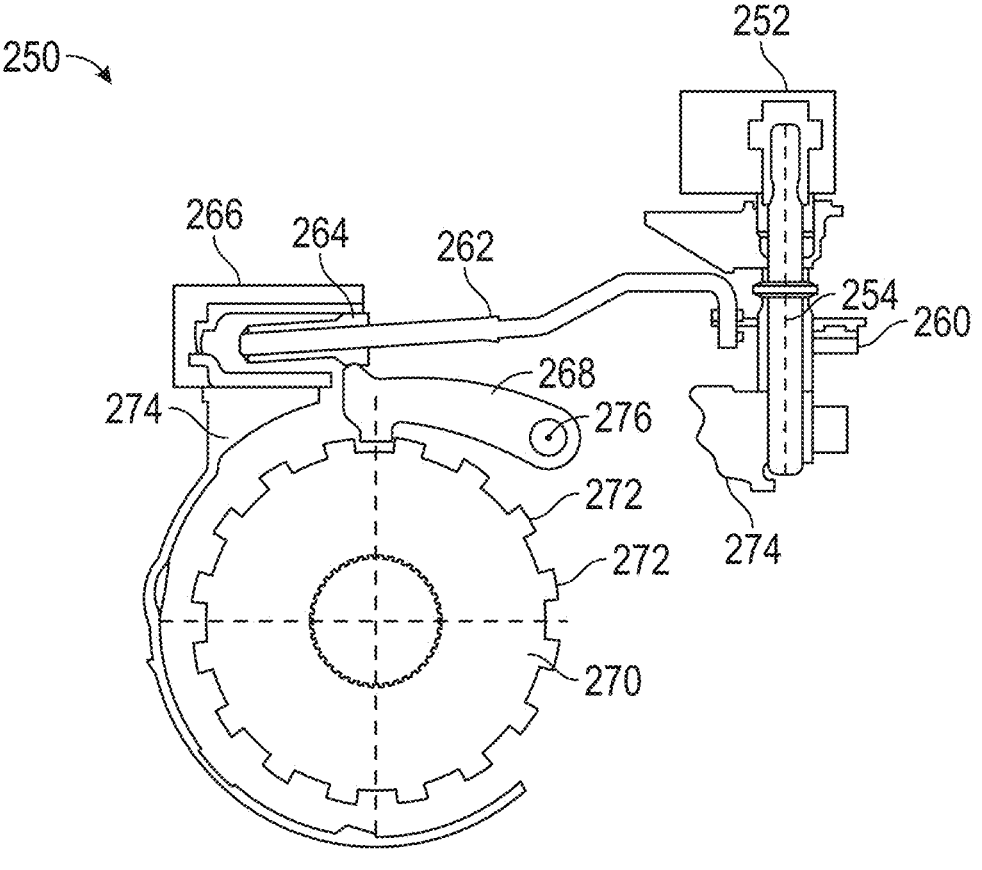
FIG. 6A is a schematic illustration of another example park actuator assembly the park actuated valve of FIGS. 2-3 in a closed position.
Figure 6B:
FIG. 6B is a schematic illustration of another example rooster comb and actuator of the park actuator assembly shown in FIG. 6A.
Figure 6B:
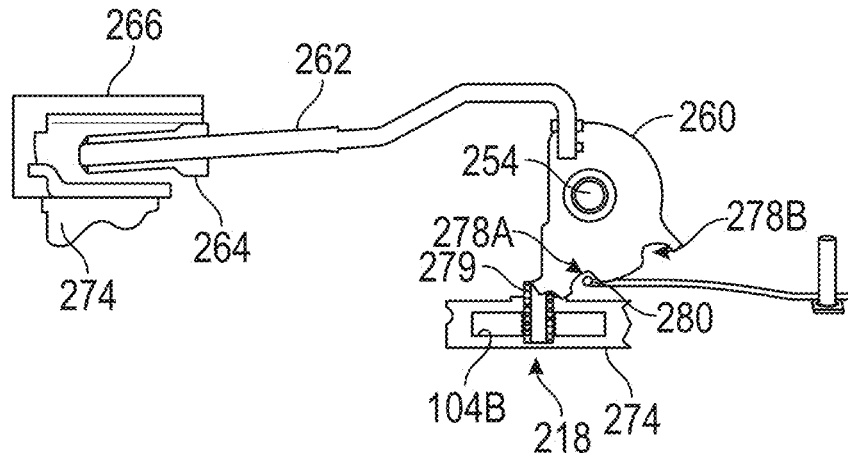
Figure 7A:
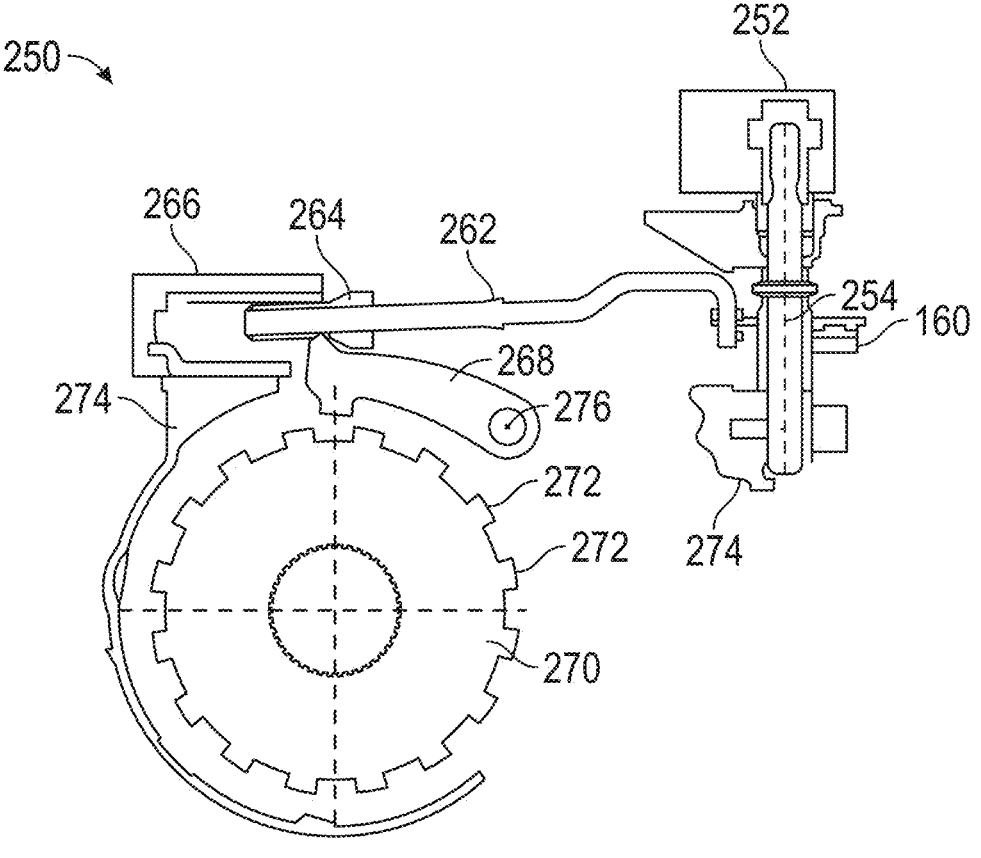
FIG. 7A is a schematic illustration of a top view of the park actuator assembly of FIG. 4A in a release position.
Figure 7B:
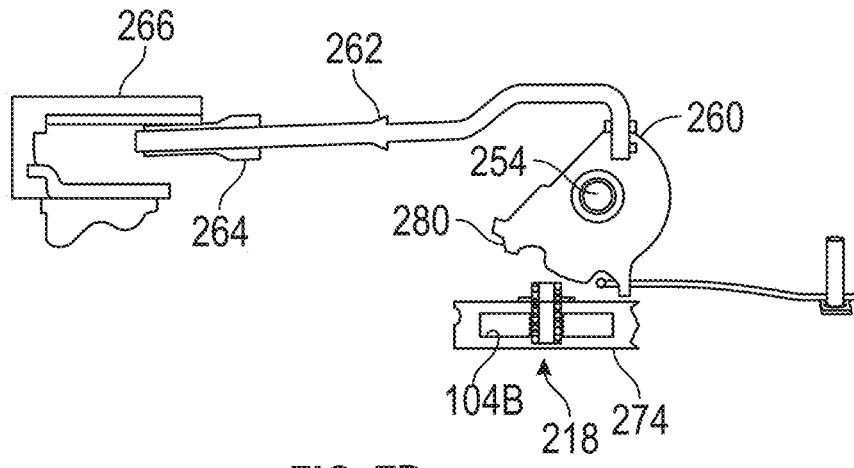
FIG. 7B is a schematic illustration of a rooster comb and actuator of the park actuator assembly shown in FIG. 4A in the release position.

As shown in FIGS. 6B and 7B, a park actuated valve 218 is integrated into the park actuator assembly 250 with the park actuated valve 218 configured to move between a closed position (FIGS. 6A-B) corresponding to the park actuator assembly 250 being in a parking position and an open position (FIGS. 7A-B) corresponding to the park actuator assembly 250 being in a release position. In the illustrated example, the park actuator valve 218 is a spring-loaded piston type valve. The park actuator assembly 250 can be used in either the lubrication system 100 or the lubrication system 200 described above to provide the park actuated valve.

As shown in FIGS. 6A-7B, the park actuator assembly 250 includes an input mechanism 252 that is mechanically connected to a rotary shaft 254. In the illustrated example, the input mechanism 252 can include a drive motor or a mechanical linkage. The input mechanism 252 is attached to a first or proximal end of a rotary shaft 254.

The input mechanism 252 causes a rooster comb 260 attached to the rotary shaft 254 to rotate and move an arm 262. The arm 262 includes an actuator 264 located at a distal end that is at least partially accepted within an opening in an actuator housing 266. Movement of the arm 262 causes the actuator 264 to bias a parking pawl 268 about a pin 276 into a drivetrain gear 270. The drivetrain gear 270 is configured to restrict rotational movement of the driveline of the vehicle 10 when the parking pawl 268 engages teeth 272 along a radially outer surface of the drivetrain gear 270. The rooster comb 260 includes a first recess 278A for accepting a locator 280 when in a first rotational position and a second recess 278B for accepting the locator 280 when in the second rotational position. Conversely, the drivetrain gear 270 is configured to allow rotational movement of the driveline of the vehicle 10 when the actuator 264 is moved to a second position allowing the parking pawl 268 to move out of engagement with the drivetrain gear 270. In the illustrated example, a housing 274 may support the rotary shaft 254 and enclose a portion of the drivetrain gear 270.

In the illustrated example, a portion of the second outlet branch 104B extends through the housing 274 or adjacent to the park actuator assembly 150.

When the rotary shaft 254 is in a first position corresponding to the park actuator assembly 150 being in the parking position, a valve engagement surface 279 on the rooster comb 260 engages the park actuated valve 218 to block the flow of lubricant through the second outlet branch 104B. When the rotary shaft 254 is in the second position, the valve engagement surface 279 is spaced form the park actuated valve 218 such that the park actuated valve 218 moves to an open position to allow lubricant flow through the second outlet branch 104B. In the case of the lubricant system 100, the cooled lubricant passes through the stator lubrication circuit 106 and not through the other lubrication circuits 108, 110, and 112 when the rotary shaft is in the first position blocking lubricant flow. Conversely, when the rotary shaft 254 is in a release position (FIGS. 7A-75B), vehicle 10 is allowed to move and lubricant is allowed to flow through the second outlet branch 104B.

Figure 8:
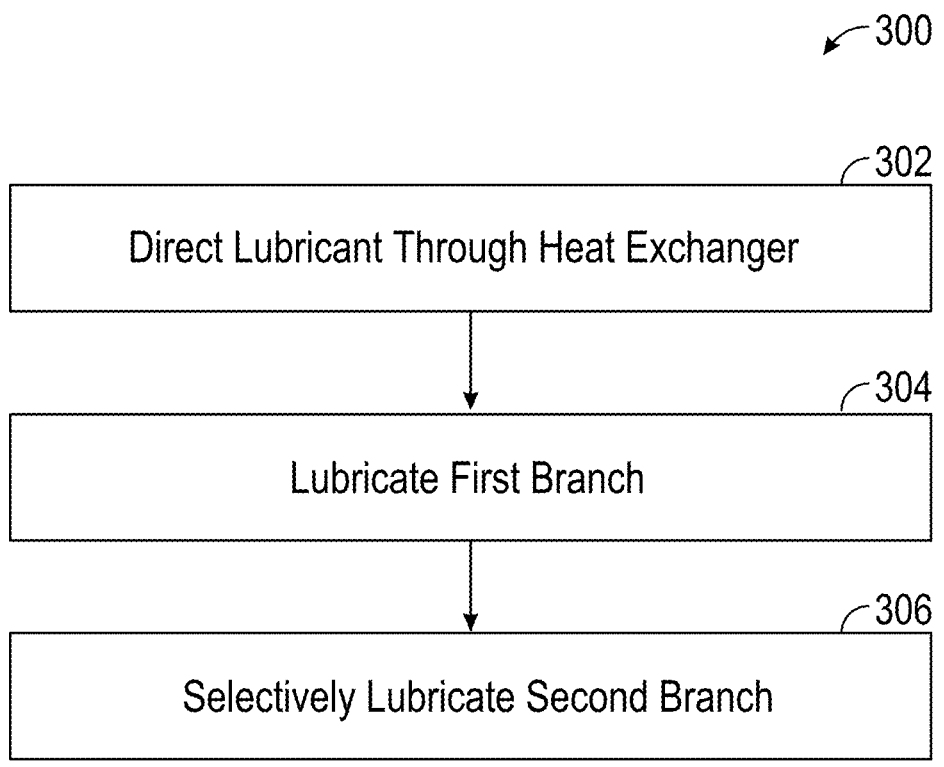
FIG. 8 is a flowchart of an example method of operating the vehicle of FIG. 1 with the park actuator assembly of FIGS. 4A-7B.

FIG. 8 illustrates a flowchart of an example method 300 of operating a vehicle with a park actuator assembly. The method 300 begins at block 302 ("Direct Lubricant Through Heat Exchanger"), by directing lubricant through the heat exchanger 102 of the one of the lubrication systems 100, 200. The lubricant may be directed with the pump 116 from the sump 115 to the heat exchanger 102. The method 300 then proceeds to Block 304.

At block 304 ("Lubricate First Branch"), the method 300 directs the lubricant through first outlet branch 104A of one of the lubrication systems 100 or 200. For the lubrication system 100, the first outlet branch 104A provides lubricant from the outlet 104 to the stator lubrication circuit 106. In the case of the lubrication system 200, the first outlet branch 104A directs the lubricant to the rotor lubrication circuit 108 simultaneously with the stator lubrication circuit 106. The method 300 then proceeds to block 306.

At block 306 ("Selectively Lubricate Second Branch"), the method 300 selectively directs lubricant to the second outlet branch 104B of the outlet 104 from the heat exchanger 102. The lubricant to the second outlet branch 104B is blocked by the park actuated valve 118, 218 when the park actuator assembly 150, 250 is in a parking position as discussed above. Conversely, the lubricant is allowed to flow through the second outlet branch 104B when the park actuator assembly 150, 250 is in a release position as discussed above.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure not be limited to the particular embodiments disclosed but will include embodiments falling within the scope thereof.

The invention claimed is:

1. A lubrication system for a vehicle, the lubrication system comprising:
   a heat exchanger having a lubricant inlet and a lubricant outlet, wherein the lubricant outlet includes a first outlet branch and a second outlet branch;
   a stator lubrication circuit fluidly connecting a stator between the lubricant inlet and the first outlet branch;
   a rotor lubrication circuit fluidly connecting a rotor between the lubricant inlet and one of the first outlet branch or the second outlet branch;
   a gearbox lubrication circuit fluidly connecting a gearbox between the lubricant inlet and the second outlet branch, wherein the gearbox lubrication circuit, the stator lubrication circuit, and the rotor lubrication circuit are connected fluidly in parallel with each other;
   a park actuator assembly including:
      a parking pawl configured to move between a parking position limiting movement of a drivetrain gear and a release position allowing movement of the drivetrain gear; and
      a park actuated valve configured to move into a first position blocking lubricant flow through the second outlet branch when the parking pawl is in the parking position and into a second position allowing lubricant flow through the second outlet branch when the parking pawl is in the release position.

2. The lubrication system of claim 1, wherein the park actuator assembly includes a rotary shaft configured to move the park actuated valve between the parking position and the release position.

3. The lubrication system of claim 2, wherein the park actuator assembly includes a rooster comb rotatably attached to the rotary shaft with an arm attached to the rooster comb at a proximal end having a park actuator at a distal end.

4. The lubrication system of claim 3, wherein the park actuator assembly is configured to bias the parking pawl towards the drivetrain gear when in the parking position.

5. The lubrication system of claim 3, wherein the park actuator assembly is configured to release the parking pawl from the drivetrain gear when in the release position.

6. The lubrication system of claim 3, wherein the park actuated valve includes a fluid passage in the rotary shaft and the rotary shaft is configured to block lubricant flow when the park actuated valve is in the parking position and the fluid passage is aligned with the second outlet branch when the park actuated valve is in the release position.

7. The lubrication system of claim 6, wherein the park actuated valve includes a spring-loaded piston type valve.

8. The lubrication system of claim 7, wherein the rooster comb includes a valve engagement surface that is configured to bias the spring-loaded piston type valve into a closed position at least partially blocking lubricant flow through the second outlet branch when the rotary shaft is in the parking position and release the spring-loaded piston type valve when the rotary shaft is in the release position.

9. The lubrication system of claim 8, wherein the rooster comb includes a first recess for accepting a locator when in a first rotational position corresponding to the parking position and a second recess for accepting the locator when in a second rotational position corresponding to the release position.

10. The lubrication system of claim 9, wherein the first recess is located adjacent a first circumferential end of a comb projection and the second recess is located adjacent a second circumferential end of the comb projection and the first and second recesses define a maximum rotational range of the rooster comb.

11. The lubrication system of claim 1, wherein the gearbox lubrication circuit, the stator lubrication circuit, and the rotor lubrication circuit are connected fluidly in parallel with an auxiliary lubrication circuit between the lubricant outlet of the heat exchanger and a sump.

12. The lubrication system of claim 1, wherein the stator lubrication circuit includes a stator orifice having a stator lubrication circuit maximum flow rate, the gearbox lubrication circuit includes a gearbox orifice having a gearbox lubrication circuit maximum flow rate, and the rotor lubrication circuit includes a rotor orifice having a rotor lubrication circuit maximum flow rate.

13. A method of operating a lubrication system, the method comprising:

directing lubricant through a heat exchanger to a lubricant outlet, wherein the lubricant outlet includes a first outlet branch and a second outlet branch;

directing the lubricant through the first outlet branch to a stator lubrication circuit; and selectively directing the lubricant through the second outlet branch to at least one of a rotor lubrication circuit, a gearbox lubrication circuit, or an auxiliary lubrication circuit based on a parking status of a park actuator assembly, wherein park actuator assembly includes:

a parking pawl configured to move between a parking position limiting movement of a drivetrain gear and a release position allowing movement of the drivetrain gear; and a park actuated valve configured to move into a first position blocking lubricant flow through the second outlet branch when the parking pawl is in the parking position and into a second position allowing lubricant flow through the second outlet branch when the parking pawl is in the release position.

14. The method of claim 13, wherein the park actuator assembly includes a rotary shaft configured to move the park actuated valve between the first position and the second position.

15. The method of claim 14, wherein the park actuator assembly includes a rooster comb rotatably attached to the rotary shaft with an arm attached to the rooster comb at a proximal end having a park actuator at a distal end.

16. The method of claim 15, wherein the park actuated valve includes a fluid passage in the rotary shaft and the rotary shaft is configured to block lubricant flow when the park actuated valve is in the first position and the fluid passage is aligned with the second outlet branch when the park actuated valve is in the second position.

17. The method of claim 15, wherein the park actuated valve includes a spring-loaded piston type valve and the rooster comb includes a valve engagement surface that is configured to bias the spring-loaded piston type valve into a closed position at least partially blocking lubricant flow through the second outlet branch when the rotary shaft is in the first position and release the spring-loaded piston type valve when the rotary shaft is in the second position.

18. A vehicle comprising:

a passenger compartment;

a plurality of wheels supporting the passenger compartment;

a traction motor having a rotor and a stator with the rotor configured to drive at least one of the plurality of wheels through a gearbox; and a lubrication system including:

a heat exchanger having a lubricant inlet and a lubricant outlet, wherein the lubricant outlet includes a first outlet branch and a second outlet branch;

a stator lubrication circuit fluidly connecting a stator between the lubricant inlet and the first outlet branch;

a rotor lubrication circuit fluidly connecting a rotor between the lubricant inlet and one of the first outlet branch or the second outlet branch;

a gearbox lubrication circuit fluidly connecting a gearbox between the lubricant inlet and the second outlet branch, wherein the gearbox lubrication circuit, the stator lubrication circuit, and the rotor lubrication circuit are connected fluidly in parallel with each other;

a park actuator assembly including:

a parking pawl configured to move between a parking position limiting movement of a drivetrain gear and a release position allowing movement of the drivetrain gear; and a park actuated valve configured to move into a first position blocking lubricant flow through the second outlet branch when the parking pawl is in the parking position and into a second position allowing lubricant flow through the second outlet branch when the parking pawl is in the release position.

19. The vehicle of claim 18, wherein the park actuator assembly includes a rotary shaft configured to move the park actuated valve between the parking position and the release position and the park actuated valve includes a fluid passage in the rotary shaft and the rotary shaft is configured to block lubricant flow when the park actuated valve is in the first position and the fluid passage is aligned with the second outlet branch when the park actuated valve is in the second position.

20. The vehicle of claim 18, wherein the park actuator assembly includes a rotary shaft configured to move the park actuated valve between the parking position and the release position and a rooster comb includes a valve engagement surface that is configured to bias a spring-loaded piston type valve into a closed position at least partially blocking lubricant flow through the second outlet branch when the rotary shaft is in the parking position and release the spring-loaded piston type valve when the rotary shaft is in the release position.

* * * * *